United States Patent [19]

Ishiguro et al.

[11] Patent Number: 4,967,127
[45] Date of Patent: Oct. 30, 1990

[54] ROBOT WITH CONTROLLED TOOL TRACKING DISPLACEMENT

[75] Inventors: Yasuo Ishiguro, Toyota; Yoshito Kato; Chisao Hayashi, both of Aichi; Masaru Nakano, Nagoya; Mitsuo Koide, Owariasahi; Hiroshi Moribe; Toshitaka Kuno, both of Nagoya, all of Japan

[73] Assignee: Toyota Jidosha Kabushiki Kaisha, Toyota, Japan

[21] Appl. No.: 370,699

[22] Filed: Jun. 23, 1989

[30] Foreign Application Priority Data

Jun. 30, 1988 [JP] Japan ................ 63-162933

[51] Int. Cl.$^5$ .............................. G05B 19/42
[52] U.S. Cl. ........................ 318/571; 318/570; 318/578; 364/474.03
[58] Field of Search ............... 318/560–634; 364/474.03, 474.09, 474.14, 474.28, 474.29, 474.31, 167.01, 175, 513, 190, 192; 901/3, 9, 15–24

[56] References Cited

U.S. PATENT DOCUMENTS

| | | | |
|---|---|---|---|
| 3,727,119 | 4/1973 | Stanley et al. | 318/568.25 |
| 3,934,186 | 1/1976 | Hayakawa et al. | 318/568.11 X |
| 4,296,473 | 10/1981 | Imazeki et al. | 364/474.03 X |
| 4,362,978 | 12/1982 | Pollard et al. | 318/568.1 |
| 4,408,286 | 10/1983 | Kikuchi et al. | 318/568.14 X |
| 4,575,665 | 3/1986 | Matsuura et al. | 318/578 |
| 4,621,332 | 11/1986 | Sugimoto et al. | 318/568.17 X |
| 4,638,221 | 1/1987 | Brignall | 318/632 X |
| 4,639,172 | 1/1987 | Kishi et al. | 318/570 X |
| 4,703,239 | 10/1987 | Yamazaki et al. | 364/474.03 |
| 4,757,457 | 7/1988 | Matsumoto | 318/571 X |
| 4,831,316 | 5/1989 | Ishiguro et al. | |

FOREIGN PATENT DOCUMENTS

| | | |
|---|---|---|
| 62-139006 | 2/1987 | Japan . |
| 63-8906 | 1/1988 | Japan . |
| 63-88612 | 4/1988 | Japan . |
| 63-88613 | 4/1988 | Japan . |
| 63-88614 | 4/1988 | Japan . |

OTHER PUBLICATIONS

Hirzinger et al., "Fast and Self-Improving compliance Using Digital Force-torque Control"; Proceedings of the 4th International Conference on Assembly Automation, Tokyo, Japan Oct. 11-13, 1983, pp. 268-281.
"Force Control System of a Light-weight Multi-articulated Robot Arms", No. 3209; Report of the 3rd Symposium of Robotics Society of Japan, Nov. 28-30, 1985, pp. 339-340.

Primary Examiner—William M. Shoop, Jr.
Assistant Examiner—Paul Ip
Attorney, Agent, or Firm—Finnegan, Henderson, Farabow, Garrett and Dunner

[57] ABSTRACT

A tracking control robot controls its arm end, which holds a tool, to track a taught path so that a reaction force between a workpiece and the tool remains constant. An ideal state for the arm end is determined from the present state of the arm end and the difference between the actual reaction force and a predetermined target force. Then, this ideal state is compared with a reference state of the arm end on the taught path to obtain a target position and a target attitude of the arm end. Since a target position is always determined independently of the last target position, no position error due to time delay affects a new target position even when the next target position is generated before the tool reaches the last target position. Thus, the robot is quick, responsive, and accurate when tracking at a constant operation speed.

14 Claims, 14 Drawing Sheets

ROBOT WITH CONTROLLED TOOL TRACKING DISPLACEMENT

BACKGROUND OF THE INVENTION

1. Field of the invention

This invention relates to a tracking control robot for controlling the motion of a tool attached to the end of a robot arm so as to track a taught path while maintaining a desired force between the tool and a workpiece.

2. Prior art

For machining operations including burring, die polishing, trimming, and buffing, an industrial robot has been required to control a reaction force applied from an object to be machined (hereinafter a workpiece) and a tool, such as a grindstone attached to the end of a robot arm.

One such robot was introduced in "Force Control System of a Light-weight Multi-articulated Robot Arms": No. 3209 Report of the 3rd symposium of Robotics Society of Japan, held on Nov. 28, 29, 30 in 1985. According to that report, the robot has, between its arm end and a tool, a displacement/force conversion mechanism with a predetermined relationship between a force applied to a predetermined axial direction and a displacement in the same axial direction. The robot also has a force sensor for detecting a reaction force applied by a workpiece to the tool. With this force sensor the robot arm is minutely controlled to adjust the detected reaction force to a predetermined value.

The above-mentioned displacement/force conversion mechanism, which is also called a compliance mechanism, includes a resilient member such as a spring, a rubber section, etc. By adjusting the displacement in a predetermined axial direction, the force applied by the tool to the workpiece can be controlled.

In this prior-art robot, the arm end is controlled to track a standard path determined by position data, which is stored during a preceding teaching process. While tracking the path, the force sensor installed in the arm end detects the reaction force transmitted from the workpiece to the tool.

By applying the detected reaction force to an equation of motion of a material particle, a position deviation $\Delta xi$ (the difference between the actual position of the arm end and a position of the arm end where a desired reaction force can be obtained) is calculated. Subsequently, a next target position $xi$ for the arm end is calculated by adding the position deviation $\Delta xi$ to the last target position $xi-1$. Then, the arm is moved to the calculated target position.

By repeating this operation, the force applied from the tool to the workpiece is maintained at a constant value.

A described above, the target position $xi$ is calculated according to the following equation:

$$xi = xi - 1 + \Delta xi$$

Generally, however, the position where the reaction force is input from the force sensor is not the same as the last target position $xi-1$. This difference is caused because the correction signal for the position and attitude of the arm end is generated at intervals of several tens of milliseconds based on the reaction force detected by the force sensor while it actually takes several hundreds of milliseconds to move the arm end to the target position and attitude. As a result, another correction signal for the position and attitude of the arm is generated before the arm attains the target position and attitude.

This situation is shown in FIGS. 14A and 14B, which illustrate the movement of the arm end of the prior-art robot while finishing a workpiece having an uneven surface profile. The solid line in the drawings indicates the actual movement of the robot arm end, and the broken line indicates the target value of the movement of the arm end, and the chain line indicates the ideal position of the arm end with a predetermined reaction force. The arm end travels from the left to the right in the drawing while machining the workpiece.

In FIG. 14A, the displacement of the compliance mechanism, which corresponds to the output of the force sensor, is used as the position deviation $\Delta x$ without any modification. In this case, the arm end travels as follows.

Until the arm end reaches the point $N=2$, the distance between the arm end and the workpiece is constant, so that the reaction force of the workpiece against the tool is also constant.

After the arm end reaches the point $N=2$, the distance between the arm end and the workpiece exceeds a predetermined value, and the force applied from the tool to the workpiece decreases. To compensate for the loss, the target value of the next point ($N=3$) is set by adding the difference between the ideal position and the actual position of the arm end to the target value of the last point ($N=2$).

At the time point $N=3$, the distance between the arm end and the workpiece still exceeds a preset value, so that the target value of the next point ($N=4$) must be corrected. At the point $N=3$, however, the arm end has not yet reached the target point. Accordingly, the non-adjusted position deviation is added to the target value of the next point ($N=4$). The non-adjusted position deviations are successively accumulated in the following points. As a result, the control system causes overshooting and oscillation as shown in FIG. 14A.

To solve the above-mentioned problems, it is possible to use a position deviation that is determined by multiplying a coefficient smaller than one (e.g., $\frac{1}{3}$ or $\frac{1}{4}$) and the displacement of the compliance mechanism, which corresponds to the force sensor output.

In this case, however, it takes longer to achieve a desired value for the force applied from the tool to the workpiece, even though overshoot never occurs. In FIG. 14B, for example, it takes ten process steps.

While the force applied by the tool to the workpiece is outside the desired value, machining accuracy deteriorates.

In order to solve the problem caused by the time lag between the time when the target value is output and when the arm actually attains the target value, it is possible to output the next correction signal after the arm attains the target value.

In this case, since it takes some hundreds of milliseconds after the output of the target value to bring the arm into the target position, as described above, each control step also requires some hundreds of milliseconds. Accordingly, the machining speed is considerably decreased. This method, therefore, is not practical.

The above-mentioned conventional robot traces the standard path based on the taught data. If some correction is required for the position of the robot arm, the arm may markedly deviate from the standard path because the position is corrected independently of the taught data.

SUMMARY OF THE INVENTION

An object of the present invention is to solve the above-mentioned problems and to provide a tracking control robot that holds teaching data for determining an accurate target position such that a desired reaction force applied by a workpiece to a tool can be obtained.

Another object of the present invention is to provide a tracking control robot that adjusts the reaction force applied by the workpiece to the tool in real time without reducing the robot operation speed.

A further object of the present invention is to provide a tracking control robot with improved responsiveness and accuracy for controlling the position and attitude of the tool.

To achieve these and other objects, the present invention has the following constitution. As shown in FIG. 1, the tracking control robot of the present invention has a tool R2 at an arm end R1 of the robot via a displacement-to-force conversion mechanism R3 that holds a predetermined relationship in a particular coordinate system between the force applied to one axial direction and the displacement in the same axial direction. The robot controls the arm end R1 to move the tool R2 to track a standard path obtained from prestored position data and to act on a workpiece W with a preset target force. The robot further comprises: present-condition detection means R4 for detecting a present position and attitude of the arm end R1; reactionforce detection means R5 for detecting a reaction force applied by the workpiece W to the tool R2 at the detecting point of the present position and attitude of the arm end R1; displacement conversion means R6 for calculating a difference between the detected reaction force and the preset target force of the tool R2 at the detecting point of the present position and attitude of the arm end R1, and for converting the difference into the displacement in the position of the tool R2; ideal-condition calculation means R7 for calculating an ideal position and attitude of the arm end R1 based on the displacement of the tool R2 and on the present position and attitude of the arm end R1; correction-amount calculation means R8 for calculating a correction amount for the position and attitude of the arm end R1 by comparing the ideal position and attitude of the arm end R1 with a reference position and attitude of the arm end R1 on the standard path; and arm-end control means R9 for controlling the position and attitude of the arm end R1 in real time according to the correction amount for the position and attitude of the arm end R1.

DETAILED DESCRIPTION OF PREFERRED EMBODIMENT

The present embodiment relates to a 6-axis articulated robot for grinding or polishing a workpiece by using a grindstone as a tool, while keeping a constant reaction force between the workpiece and the tool.

Figure 1:
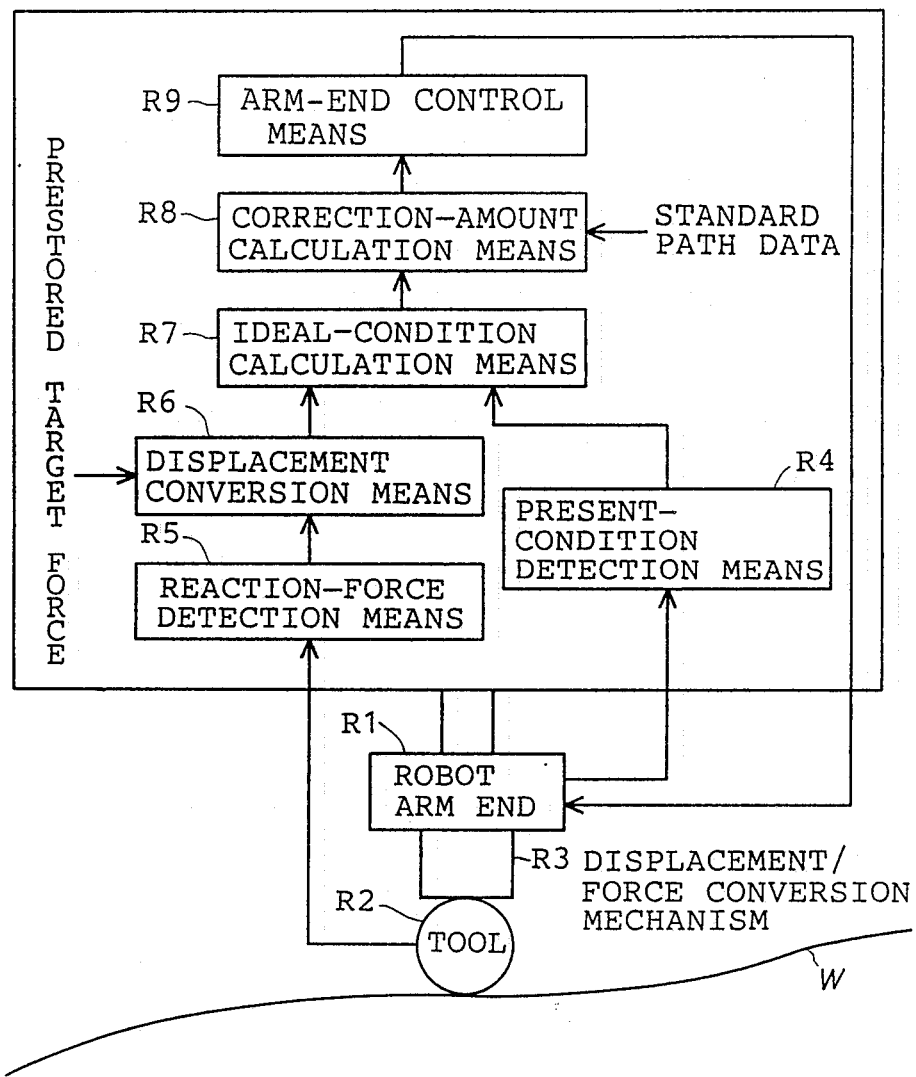
FIG. 1 is a block diagram showing a fundamental structure of the present invention.
Figure 2:
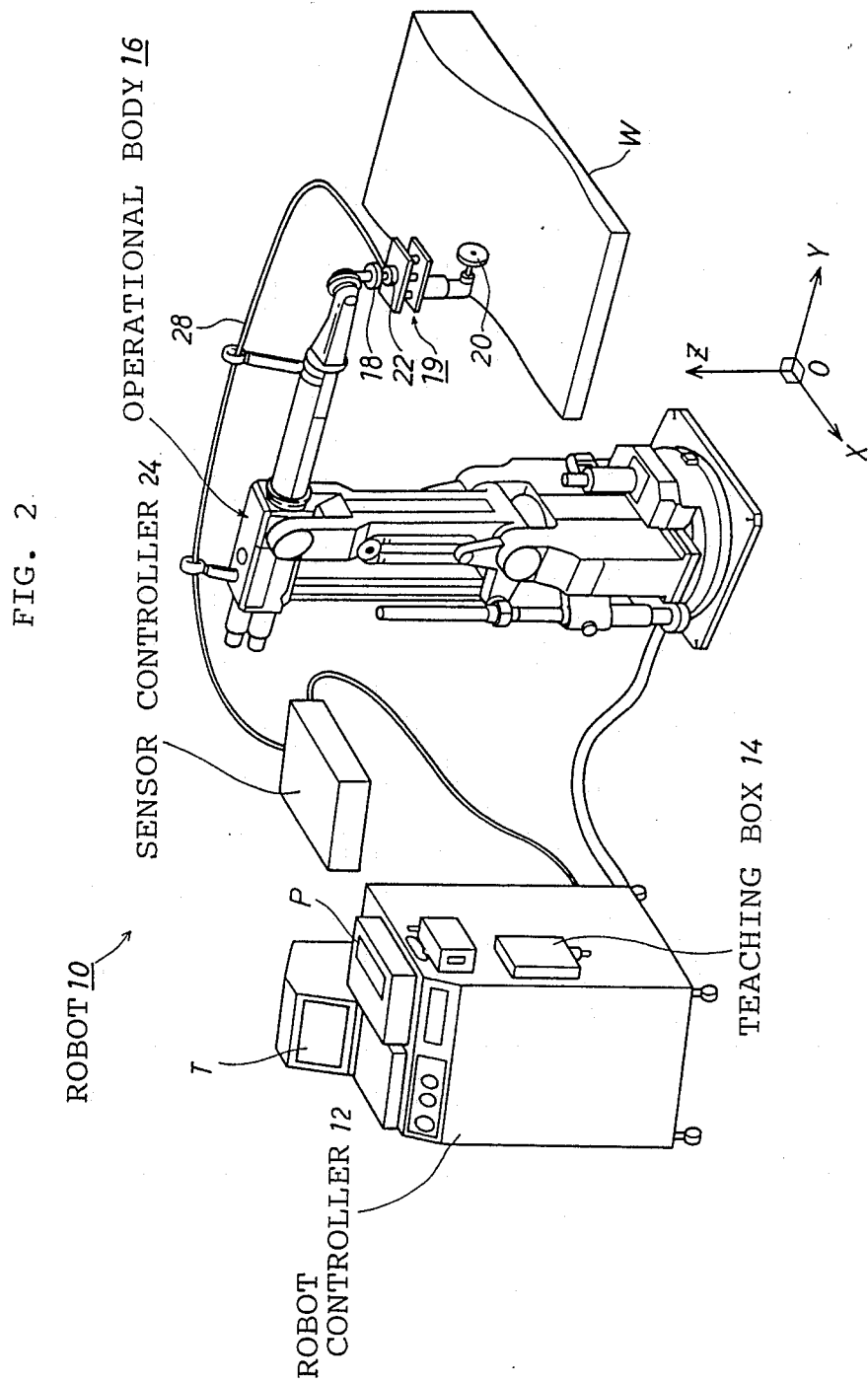
FIG. 2 is a perspective view of a robot and a control system as an embodiment of the present invention.

The construction of the robot 10 is shown in FIG. 2. The robot 10 is equipped with a robot controller 12 for controlling the operation of the robot 10; a teaching box 14 on the robot controller 12 that enables an operator to teach the robot 10 in advance how to do a task; an operational body 16 with six axes that is actuated in accordance with signals sent from the robot controller 12; a tool 20, and a force sensor 22 for detecting reaction force of a workpiece W against the tool 20, both being installed on a compliance mechanism 19 at an arm end 18 on the operational body 16; and a sensor controller 24 for processing the signal sent from the force sensor 22. Moreover, the robot controller 12 includes a terminal T for input and output, and a printer P.

Figure 3A:
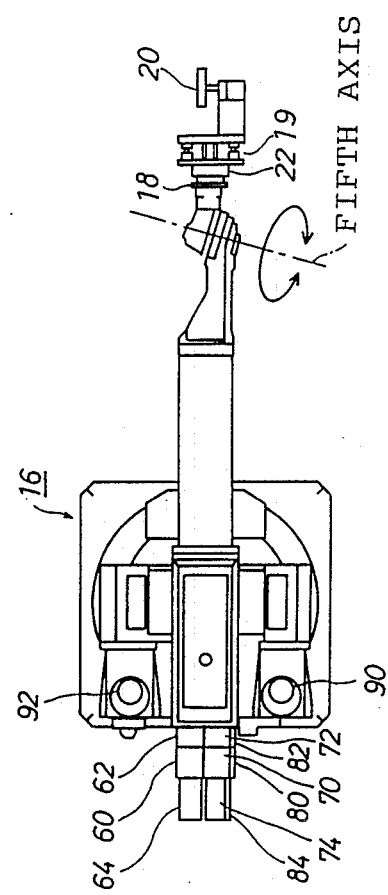
FIGS. 3A, 3B, and 3C are a plan view, a front view, and a left side view, respectively, of an operational body of the robot.
Figure 3C:
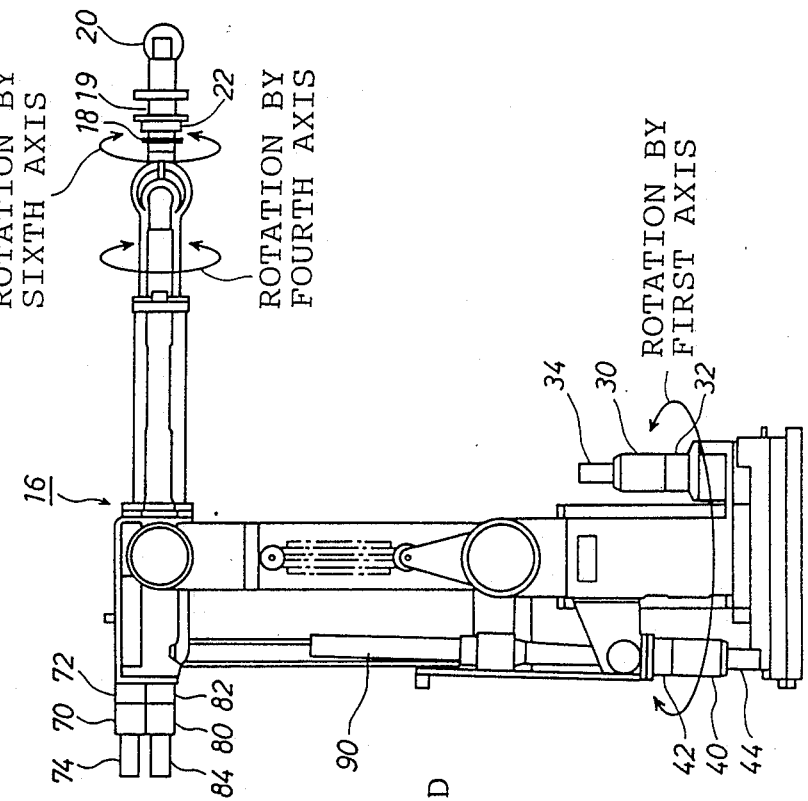
Figure 3B:
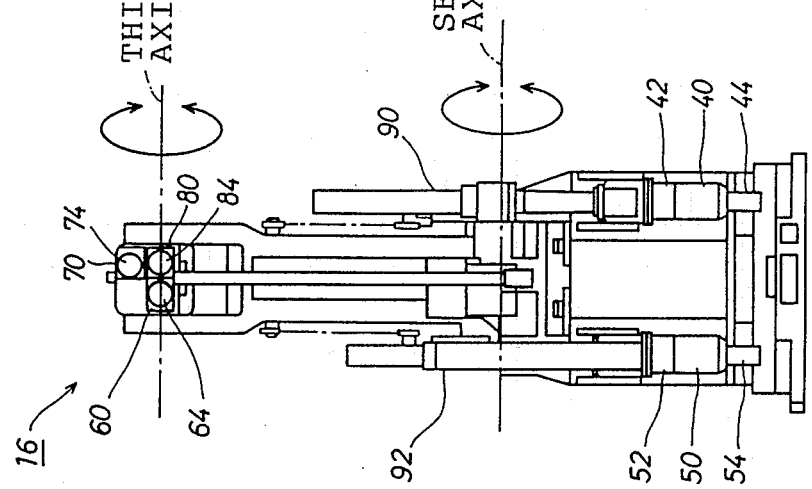

Detail explanations for each part of the robot 10 are set forth. First, the operational body 16 of the robot 10 is explained with reference to FIGS. 3A, 3B, and 3C, respectively showing a plan view, a front view, and a left side view of the operational body 16. The operational body 16 has six axes of rotation. The first, second, and third axes control the position of the arm end 18 in relation to the workpiece W; and the fourth, fifth, and sixth axes control the attitude of the arm end 18 in relation to the workpiece W.

Each axis has a motor, a brake for stopping the rotation, and an encoder for detecting the rotation speed of the axis: the first axis includes a first motor 30, a first brake 32, and a first encoder 34; the second axis includes a second motor 40, a second brake 42, and a second encoder 44; the third axis includes a third motor 50, a third brake 52, and a third encoder 54; the fourth axis has a fourth motor 60, a fourth brake 62, and a fourth encoder 64; the fifth axis includes a fifth motor 70, a fifth brake 72, and a fifth encoder 74; and the sixth axis includes a sixth motor 80, a sixth brake 82, and a sixth encoder 84.

Rotations about the second axis and the third axis by the motors 40 and 50 are converted into linear movements via ball-screw feeds 90 and 92, and the linear movements are converted into rotations about the axes by means of parallel links. Rotations about the other axes are actuated by the respective motors via torque tubes, reduction gears, helical gears, and other transmitting members.

Figure 4:
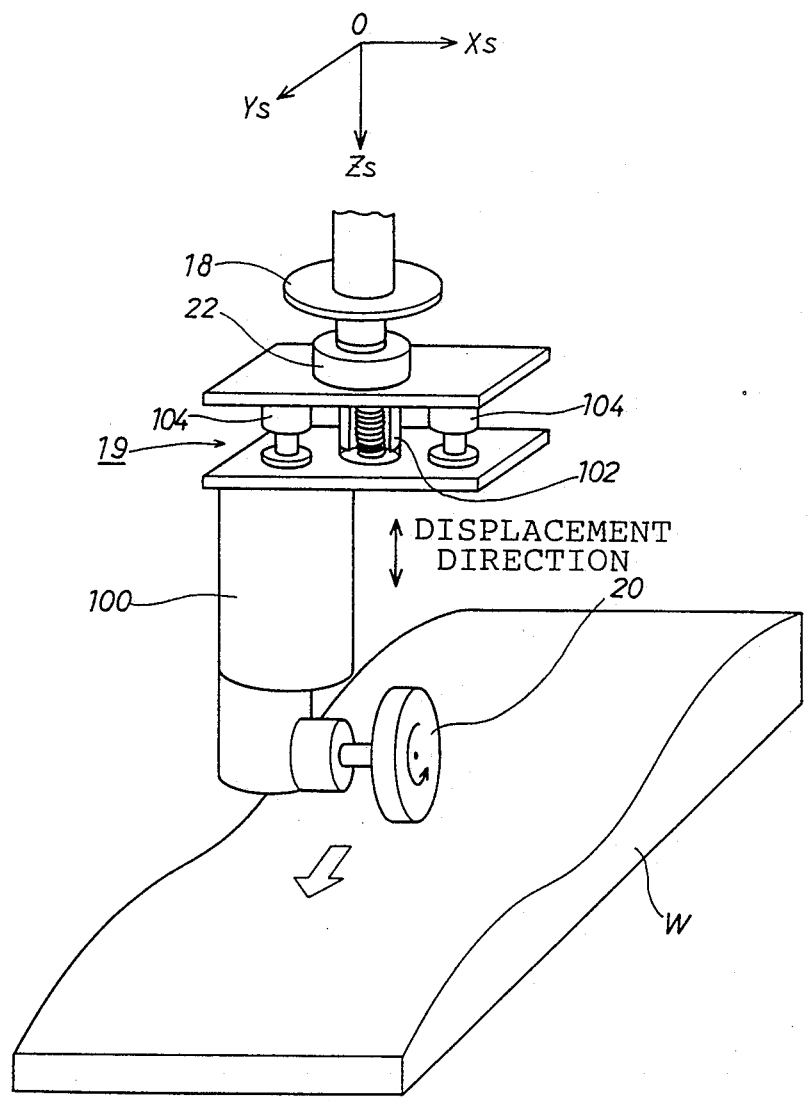
FIG. 4 is a perspective view showing a robot arm end.

In FIG. 4, the arm end 18 has a grindstone 20, a motor 100, a compliance mechanism 19, and a force sensor 22. The grindstone 20 is a tool for machining the workpiece W. The motor 100 is connected to the grindstone 20 via a gear (not shown) so as to rotate the grindstone 20. The compliance mechanism 19 is composed of a spring 102 and dampers 104, and slides with reaction forces only in the displacement directions shown in FIG. 4. The force sensor 22 is installed between the compliance mechanism 19 and the arm end 18 to detect the reaction force applied by the workpiece W to the grindstone 20. The relationship between the displacement of the compliance mechanism 19 and the force is determined in advance.

The force sensor 22 in this embodiment uses a strain gauge for detecting forces in three axes, and torques around the three axes, consisting of an axis along the displacement of the compliance mechanism 19 and two axes that are perpendicular to the displacement axis and also perpendicular to each other.

Force data Fsen(KH1) detected by the force sensor 22 represents the force and the moment along the each axis in a sensor coordinate system O-Xs-Ys-Zs with the origin 0 at the position of the force sensor 22. The force data is expressed by the following six-dimensional vector.

Fsen=(Fxs, Fys, Fzs, MNxs, MNys, MNzs)T, where T indicates a transposed matrix, F means force, MN means moment, and xs, ys, and zs are the sensor axes.

In this embodiment, the zs-axis of the sensor coordinate system corresponds to the displacement axis of the compliance mechanism 19.

Set forth next is the constitution of the robot controller 12 that controls the 6-axis operational body 16 and also acts as a teaching system for the robot 10.

Figure 5:
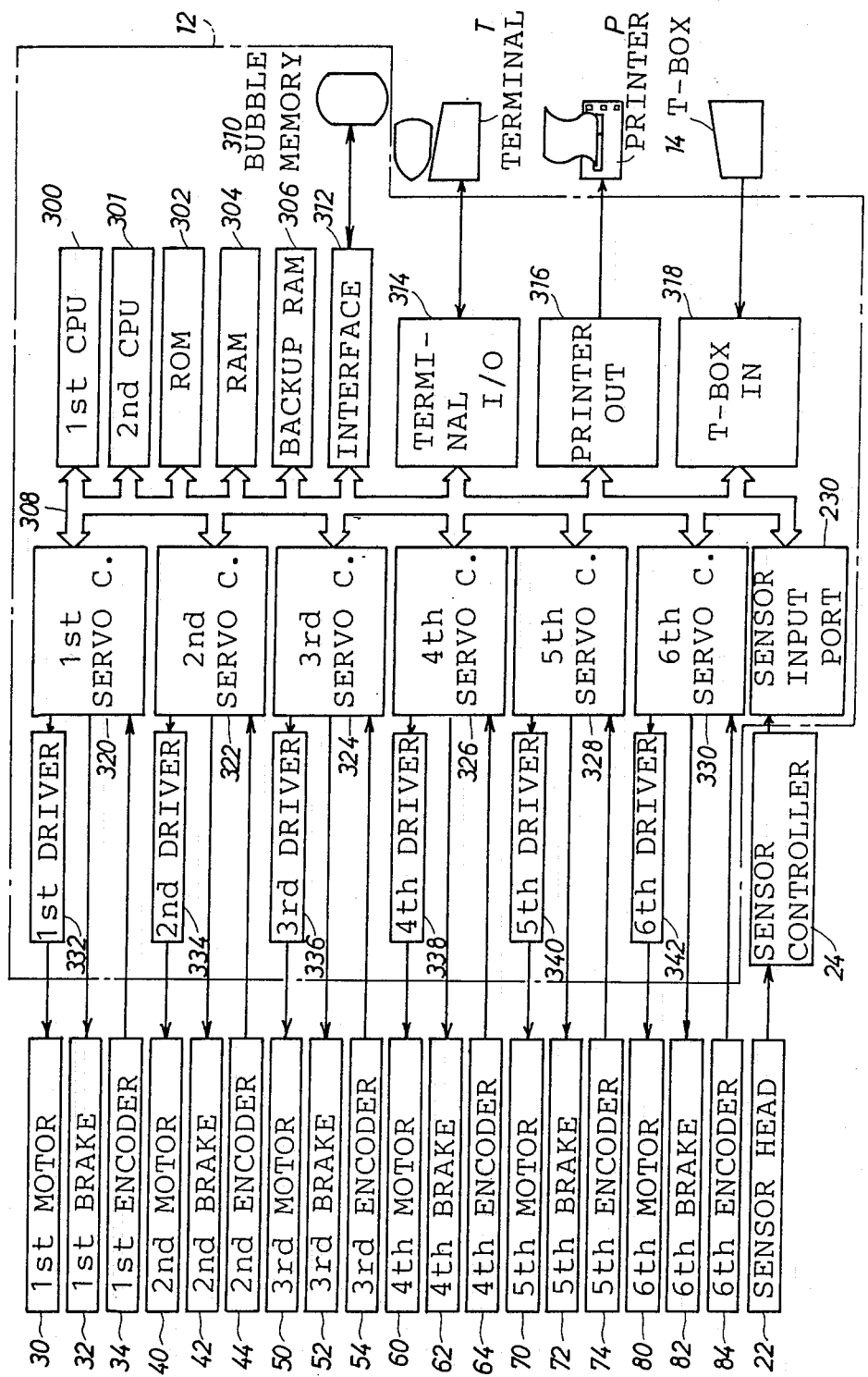
FIG. 5 is a block diagram showing the constitution of a robot controller.

The robot controller 12, diagramed in FIG. 5, is a microcomputer consisting of a first CPU 300, a second CPU 301, a ROM 302, a RAM 304, and a backup RAM 306, which are well-known and are connected to input/output ports via a bus 308.

Input/output ports, which cooperate with the first CPU 300 and the second CPU 301 as major components of the robot controller 12, include: a bubble-memory interface 312 for a bubble memory 310; a terminal input/output port 314 for a terminal T having a CRT display and a keyboard; a printer output port 316 for a printer P; a teaching box input port 318 for the teaching box 14; a sensor input port 230 for receiving electrical signals sent from the force sensor 22 via a sensor controller 24, and for generating an interrupt in the second CPU 301; and servo circuits 320, 322, 324, 326, 328, and 330 for the first through sixth axes, respectively.

Each servo circuit 320 through 330 is of the intelligent type with its own CPU. When the target position data and the target attitude data for the grindstone 20 are sent from the first CPU 300 via the bus 308, the control amount for individual six axes are input from the encoders 34, 44, 54, 64, 74, and 84. Based on these control amounts, the first through sixth motors 30, 40, 50, 60, 70, and 80 are driven via the respective drivers 332, 334, 336, 338, 340, and 342. Then, the tip of the grindstone 20 is brought into the target position and attitude. Moreover, the first through sixth servo circuits 320, 322, 324, 326, 328, and 330 respectively drive the first through sixth brakes 32, 42. 52, 62, 72, and 82 as the occasion demands so as to prevent the arm from operating or falling down from i t s dead weight when the power supply for the servo circuits 320 through 330, or for the motors 30, 40, 50, 60, 70, and 80 is turned off for an emergency stop.

Figure 6:
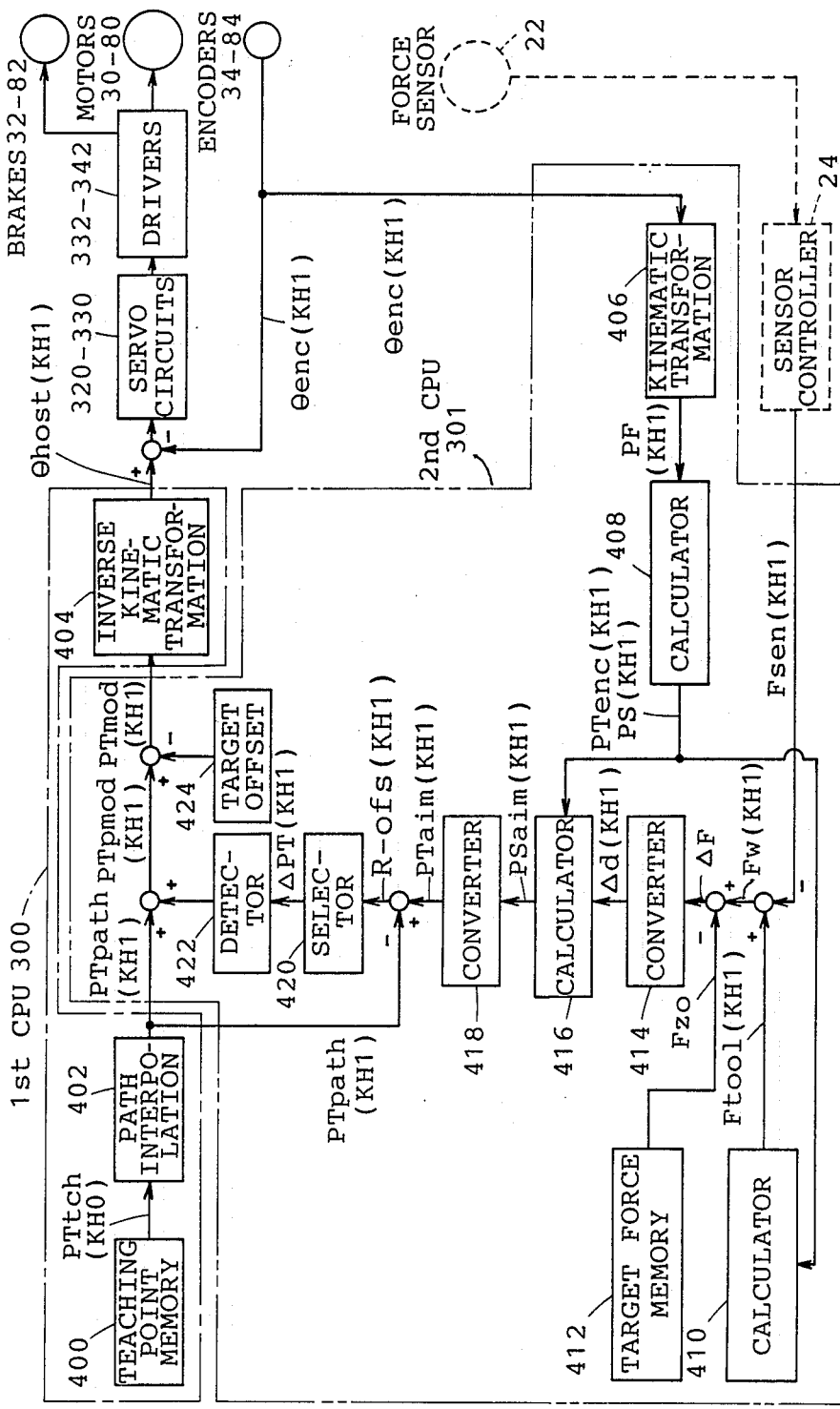
FIG. 6 is a block diagram showing the control section of the robot controller.

The operation of the robot controller 12 is hereinafter described. The control system of the robot controller 12 consists mainly of two sections, i.e., the first and second CPUs 300 and 301, as shown in FIG. 6. The first CPU 300 sends standard-path data PTpath(KH1), which is obtained by interpolating the previously taught data, to the second CPU 301. Then, the first CPU 300 receives an initial target value PTmod(KH1) modified by a correction amount. Based on this initial target value PTmod(KH1), a final target value $\theta$host(KH1) for each axis is calculated and sent to each servo circuit, which is the operation control section.

On the other hand, the second CPU 301 calculates a correction amount $\Delta$PT(KH1) based on the force data from the force sensor 22, the attitude data of the arm end 18 concurrent with the force data, and the standard-path data PTpath(KH1) from the first CPU 300. By adding an offset amount to the calculated correction amount, the second CPU 301 calculates a target value PTmod(KH1) to send it to the first CPU 300.

Set forth is a detailed explanation of the control by the first CPU 300. Before starting a particular job with the robot 10, an operator uses the teaching box 14 to teach the robot 10 which work points on the workpiece W the tool should trace and what attitude the tool should take, in the same manner as with conventional robots. Such data is stored in a teaching-point memory 400 in the RAM 304.

The teaching-point data represents the values linking the base coordinates of the robot and the work point of the tool. The m-th point of the teaching data is shown by the following matrix:

$$PTtch[m] = \begin{bmatrix} NX & OX & AX & X \\ NY & OY & AY & Y \\ NZ & OZ & AZ & Z \\ 0 & 0 & 0 & 1 \end{bmatrix}, \text{wherein} \quad (1)$$

NX, NY, and NZ are the X-Y-Z components of a normal vector; OX, OY, and OZ are the X-Y-Z components of an orientation vector; AX, AY, and AZ are the X-Y-Z components of an approach vector; and X, Y, and Z are the X-Y-Z components of a position vector of the m-th teaching point. Every component of the vectors is represented by a coordinate system 0-XYZ (see FIG. 2) with the origin 0 at the predetermined standard point of the operational body 16.

The normal vector, the orientation vector, and the approach vector, perpendicular to one another, indicate the working direction of the tool at the teaching point shown by the above matrix. The variables for indicating the points referred to in the following explanation are also represented by the same type of matrix.

After the teaching operation, the robot 10 starts the particular job in response to an operation start signal. First of all, a path interpolating circuit 402 interpolates KHO-th teaching-point data PTtch(KH0) sent from the teaching-point memory 400, and then calculates a standard-path data PTpath(KH1) for the tool 20. This standard-path data PTpath(KH1) defines a standard path for the tool 20 to follow. Subsequently, the standard-path data PTpath(KH1) is sent to the second CPU 301, which produces modified-targetpoint data PTmod(KH1) that the CPU 301 sends to an inverse kinematic transformation circuit 404.

Figure 7:
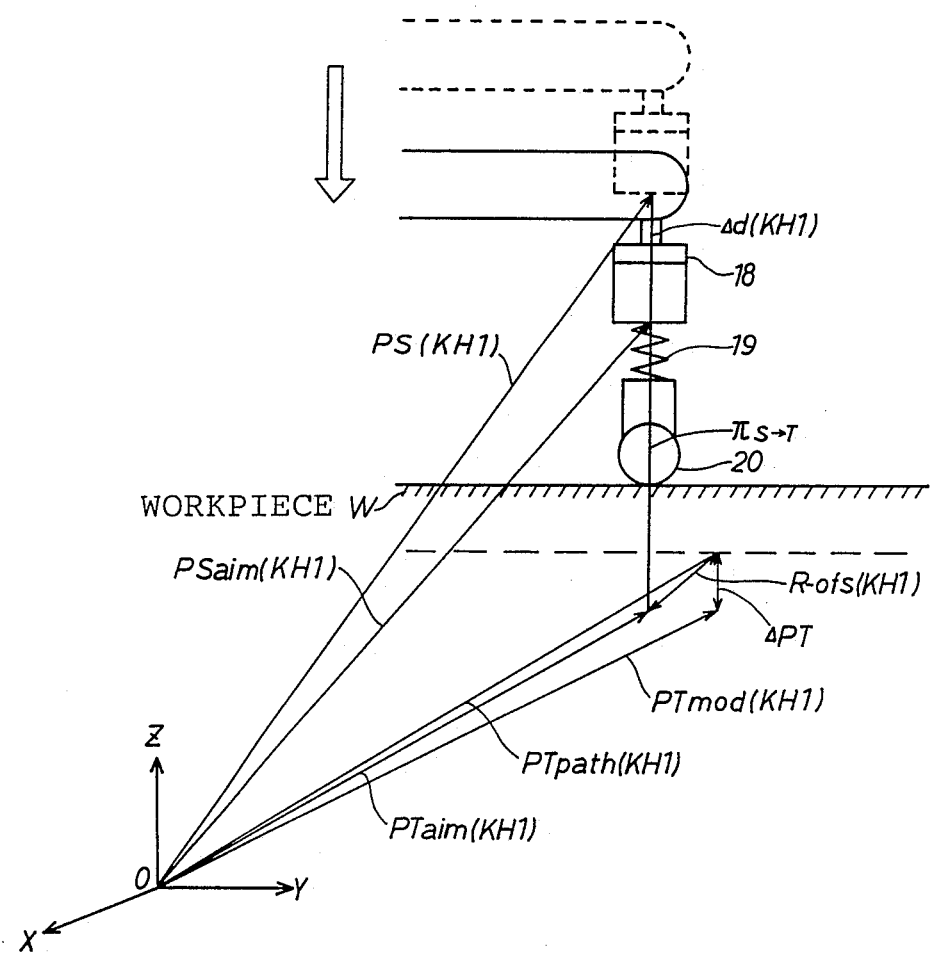
FIG. 7 is an illustration indicating positional relationships among different control points.

The inverse kinematic transformation circuit 404 transforms the modified-target-point data PTmod(KH1) into rotation angle data θhost(KH1) for each of the six axes. The rotation angle data are sent to the corresponding servo circuits 320 through 330. Then, the motors 30, 40, 50, 60, 70, and 80 for each axis are driven via the corresponding driver circuits 332 through 342 so as to shift the work point of the grindstone 20 to the point corresponding to the modified-target-point data PTmod(KH1). FIG. 7 shows the relationships among the grindstone 20, the workpiece W, PTpath(KH1), ΔPT(KH1), and PTmod(KH1).

The following is the explanation of the second CPU 301 for determining modified-target-point data PTmod(KH1), referring to FIG. 6. The second CPU 301 executes its process in parallel with the first CPU 300. The time interval in the first CPU 300 for transmitting PTpath(KH1) to the second CPU 301 is equal to the total time interval in the second CPU 301 for receiving PTpath(KH1) from the first CPU 300, calculating the correction data PTmod(KH1) and transmitting it back to the first CPU 300.

On receiving PTpath(KH1) from the first CPU 300, the second CPU 301 starts its control process. First, each set of rotation angle data θenc(KH1) from the encoders 34, 44, 54, 64, 74, and 84 of the six axes is transformed into flange-end data PF(KH1) in the kinematic transformation circuit 406 by using the following equation.

$$PF(KH1) = \Lambda[\theta enc(KH1)] \quad (2)$$

where $\Lambda$ is a kinematic transformation, and $[\theta enc(KH1)]$ is an angle vector.

Subsequently, a tool-work-point-coordinate/sensor-coordinate calculation circuit 408 calculates sensor-end data PS(KH1) and actual position data PTenc(KH1) by using the flange-end data PF(KH1) in the following formulas (3) and (4).

$$PS(KH1) = PF(KH1) \cdot \pi_{f \to s} \quad (3)$$

$$PTenc(KH1) = PF(KH1) \cdot \pi_{f \to t} \quad (4),$$

in which $\pi_{f \to s}$ is a position/attitude matrix representing the position of the sensor end in relation to the flange end of the tool, and $\pi_{f \to t}$ is a position/attitude matrix representing the position of the work point in relation to the flange end.

The purpose of the above conversion is to convert the force and the moment of each axis at the force sensor 22, into those at the position of the tool 20.

When the flange-end data PF(KH1) is input, force data Fsen(KH1) is also input from the force sensor 22 via the sensor controller 24. As explained before, the force data Fsen(KH1) represents force and moment of each axis of the sensor coordinate 0-Xs-Ys-Zs with the origin 0 at the position of the force sensor 22. The force data Fsen(KH1) is represented by a 6-dimensional vector.

The force data Fsen(KH1) is composed of a weight Mtool of the tool 20 and a reaction force Fw applied from the workpiece W to the tool 20. In this embodiment, it is supposed that the reaction force Fw is equal to a target value Fzo which is stored in advance in a target-force memory 412 of the RAM 304. As the robot 10 moves in free space and changes the attitude of the arm end 18, the tool weight for each of the six axes detected by the force sensor 22 also varies.

Figure 8:
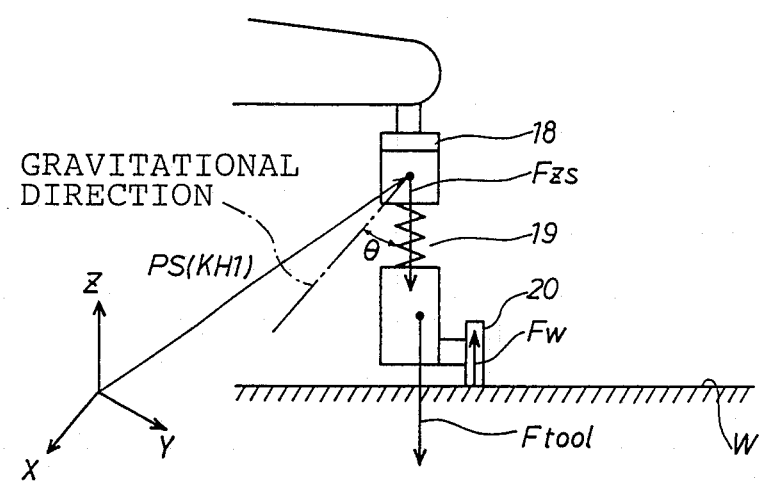
FIG. 8 is an illustration of force data detected by a force sensor.

To facilitate the explanation of the tool weight change from the tool attitude change, the tool 20 is adjusted only in the sliding direction of the compliance mechanism 19, i.e., the displacement direction. Moreover, the sliding direction corresponds to both the Zs-axis of the sensor coordinate system and the displacement direction of the compliance mechanism 19 shown in FIG. 4. As shown in FIG. 8, a Zs-axis component of the force data Fsen is a difference between a Zs-axis component Ftool of the tool weight and the reaction force Fw of the workpiece W. When the angle between the correction direction (Zs-axis) and the gravitational direction (chain line) is $\theta$, the Zs-axis component Ftool of the tool weight is calculated by a formula Ftool=-Mtool·cosθ. If the reaction force applied from the workpiece W to the tool 20 is represented by Fw, the Zs-axis component Fzs of the force data Fse is calculated according to the following formula:

$$\begin{aligned} Fzs &= Mtool \cdot \cos\theta - Fw \\ &= Ftool - Fw \end{aligned} \quad (5)$$

The tool weight applied to each axis is calculated in the tool weight calculation circuit 410 in FIG. 6. First, the value cosθ is calculated based on the sensor coordinate data PS(KH1). Next, the tool weight Ftool in the correctional direction (Zs-axis) is calculated by using the prestored tool data Mtool.

If the X-Y plane of the robot coordinate system is parallel to the ground (see FIG. 2), the Z-axis direction of the robot coordinate system 0-X-Y-Z is identical with the gravitational direction, so that the value of cosθ can be obtained by extracting a component of the sensor coordinate data PS(KH1). Namely, the sensor coordinate data PS(KH1) represents a relative position and attitude of the sensor coordinate system in relation to the robot coordinate system 0-X-Y-Z. It is shown as follows:

$$PS(KH1) = \begin{bmatrix} Xsx & Ysx & Zsx & X \\ Xsy & Ysy & Zsy & Y \\ Xsz & Ysz & Zsz & Z \\ 0 & 0 & 0 & 1 \end{bmatrix} \quad (6)$$

Accordingly, the angle cosθ defined by the Zs-axis of the sensor coordinate system and the Z-axis of the robot coordinate system is shown as follows:

$$\cos\theta = Zsz \quad (7)$$

On the other hand, if the X-Y plane of the robot coordinate system is not parallel to the ground, the angle cosθ is an inner product of a vector G in the gravitational direction of the robot coordinate system, i.e., (X, Y, Z)=(0, 0, 1), and the Zs-vector (Zsx, Zsy, Zsz) of the sensor coordinate data PS(KH1).

$$\cos\theta = (G \cdot Zs)/||G|| \cdot ||Zs|| \quad (8)$$

Figure 9:
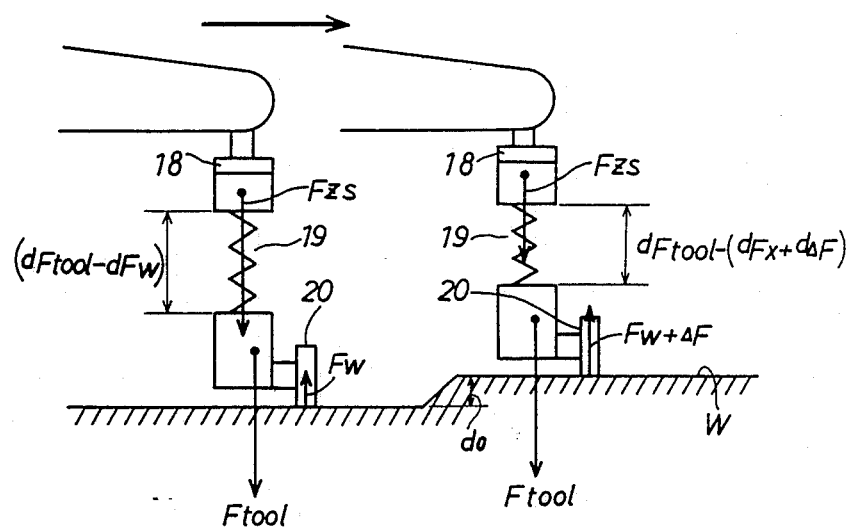
FIG. 9 is an illustration showing the detection of a change in the reaction force.

If a reaction force greater than a target force Fzo by ΔF is applied, such a difference ΔF can be specified in the following manner. In FIG. 9, dFtool, dFw, and dΔF represent the displacement of the compliance mechanism 19 corresponding to the forces Ftool, Fw and ΔF, respectively. The arm end 18 shown in the left side of the drawing is in a state in which the reaction force applied from the workpiece W is equal to the target force Fzo. On the other hand, the arm end 18 shown in the right side of the drawing is in a state in which the arm end 18 has been moved to the right portion of the workpiece W where the distance between the workpiece W and the arm end 18 is shorter by d0 while the reaction force Fw from the workpiece W is greater by ΔF.

When the reaction force Fw of the workpiece W is equal to the target force Fzo, the relationships shown by the formula (5) is satisfied. If the force ΔF is added to Fw, a relationship shown by the following formula (9) is satisfied.

$$Fzs = Ftool - (Fw + \Delta F) \tag{9}$$

Since the values Fzs, Ftool, and Fw are already known, the additional force ΔF is obtained by using the following formula:

$$\Delta F = -Fzs + Ftool - Fw \tag{10}$$

The calculated ΔF is the amount needed to correct the reaction force. The position deviation Δd needed to make ΔF zero is obtained in a deviation conversion circuit 414 in FIG. 6.

If the tool weight Mtool (hereinafter referred to as M) below the sensor is a material particle, a relation shown in the following equation of motion results.

$$\Delta F = M\ddot{D} + c\dot{D} + K\Delta d \tag{11}$$

In the above formula, D represents the tool position in the direction of Zs-axis based on the position of the sensor, c and K respectively indicate a viscosity constant and a spring constant of the compliance mechanism 19. From the formula (11), the position deviation Δd is obtained as follows:

$$\Delta d = (\Delta F - M\ddot{D} - c\dot{D})/K \tag{12}$$

Because the above calculations are executed every discrete cycle, Δd(KH1) is approximated as follows. In the following equation, τ is one cycle time, Δd(KH1−1) is the position deviation Δd during the last cycle, and Δd(KH1−2) is Δd during the second-to-last cycle. By approximating $\ddot{D}$ and $\dot{D}$ using Δd(KH1−1) and Δd(KH1−2), Δd(KH1) is approximated as:

$$\Delta d(KH1) = 1/K \cdot [\Delta F - M/\tau^2\{D(KH1 - 2) - 2D(KH1 - 1) + D(KH1)\} - c/\tau\{D(KH1 - 1) - D(KH1)\}], \tag{13}$$

where $$D(KH1) = \begin{bmatrix} 100 & 0 \\ 010 & 0 \\ 001 & \Delta d(KH1) \end{bmatrix}$$

If M and c≈0 in the above-mentioned formula, then Δd(KH1)=ΔF/K. As a result, the inertia and viscosity terms would be delayed one cycle. However, since Δd(KH1)≈Δd(KH1−1) when one cycle τ is shorter than one hundred milliseconds, it is possible to calculate the position deviation Δd(KH1) in relation to ΔF ignoring the negligible cycle delay.

In some cases, such as when control is a static, or when M and the constant c are extremely small values, both M and c can be eliminated from this calculation.

In the present embodiment, the position deviations Δd(KH1−1) and Δd(KH1−2) (i.e., the values one cycle and two cycles prior to Δd(KH1)) are used for approximating the tool position D. It is also possible to use Δd(KH1+1) and Δd(KH1+2) (i.e., the values one and two cycles after Δd(KH1)) to approximate the tool position, as shown in the following formula.

$$\Delta d(KH1) = 1/K \cdot [\Delta F - M/\tau^2\{d(KH1) - 2D(KH1 + 1) + D(KH1 + 2)\} - c/\tau\{D(KH1 + 1) - D(KH1 + 2)\}] \tag{13'}$$

Based on the position deviation amount Δd(KH1) in relation to the force ΔF and the sensor coordinate data PS(KH1), an ideal position PSaim(KH1) of the sensor 22, at which the reaction force is equal to the target force Fzo(KH1), is calculated in an ideal position calculation circuit 416 (FIG. 6) using the following formula:

$$PSaim(KH1) = PS(KH1).D(KH1) \tag{14}$$

$\pi_{s \rightarrow t}$ is calculated as follows by using PTenc(KH1) calculated at step 408.

$$\pi_{s \rightarrow t} = PSaim(KH1)^{-1} \cdot PTaim(KH1) \tag{14'}$$

$$PTaim(KH1) = PSaim(KH1) \cdot \pi_{s \rightarrow t}, \tag{15}$$

where $\pi_{s \rightarrow t}$ represents a matrix indicating the position and attitude of the tool-work-point coordinates in relation to the sensor coordinates.

The ideal position PSaim(KH1), which is data in the sensor coordinate system, is converted into data PTaim(KH1) in the robot coordinate system in a tool work-point conversion circuit 418 (FIG. 6) in accordance with the following formula:

Subsequently, equation (16) is used to obtain a deviation R-ofs(KH1) between the ideal position PTaim(KH1) and the standard-path data PTpath(KH1) that has been obtained using the path interpolation circuit 402.

$$R\text{-}ofs(KH1) = PTpath(KH1)^{-1}.PTaim(KH1) \tag{16}$$

The ratio R-ofs(KH1) is used to correct the position in the correction direction and to maintain a taught speed in the proceeding direction of the tool, which is normally perpendicular to the correction direction. This correction using R-ofs(KH1) is necessary because the actual tool position is, in effect, behind the standard-path position PTpath(KH1) as shown in FIG. 7, and the ideal position of the tool work point PTaim(KH1) corresponding to the actual tool position is also behind. Correction with those delayed values will change the moving speed of the tool.

Subsequently, a correction-element-selection circuit 420 (FIG. 6) determines a correction amount ΔPT(KH1) by applying the ratio R-ofs(KH1) only to the matrix component that corresponds to the element detected by the force sensor 22. The correction amount ΔPT(KH1) is determined as follows:

$$\Delta PT(KH1) = \begin{bmatrix} 1000 \\ 0100 \\ 001Z \\ 0001 \end{bmatrix} \quad (17)$$

In the above matrix, Z is the same as the element Z in the ratio R-ofs(KH1). The correction amount $\Delta PT(KH1)$ is sent to an abnormality detection circuit 422 and compared with a predetermined value $\beta$. If the absolute value $||\Delta PT(KH1)||$ of $\Delta PT(KH1)$ is greater than $\beta$, the robot may be running off the desired path. In that case, emergency action, such as emergency stop, is taken. On the other hand, if $||\Delta PT(KH1)||$ is smaller than $\beta$, next work-point correction data PTpmod(KH1) is calculated using the correction amount $\Delta PT(KH1)$ according to the following formula.

$$PTpmod(KH1) = PTpath(KH1) \cdot \Delta PT(KH1) \quad (18)$$

Subsequently, modified-target-point data PTmod(KH1) is determined based on an offset Ofs(KH1) from the target point in a target offset circuit 424, according to the following formula.

$$PTmod(KH1) = PTpmod(KH1) \cdot Ofs(KH1), \quad (19)$$

where PTpmod(KH1) indicates an initial target tool-end coordinate.

The modified-target-point data PTmod(KH1) is transmitted to the first CPU 300, and the process in the second CPU 301 is completed.

Figure 10:
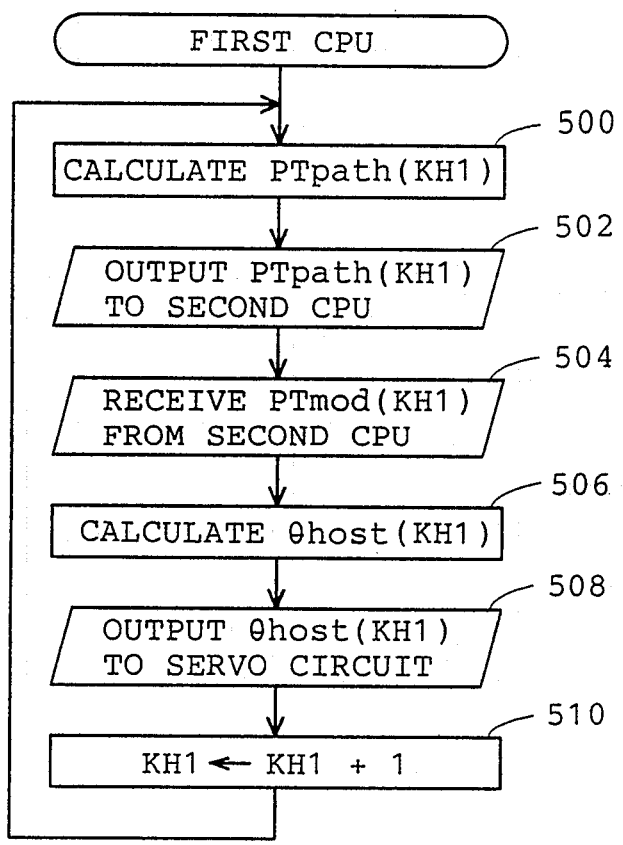
FIG. 10 is a flow chart indicating control processes executed in a first CPU.
Figure 11:
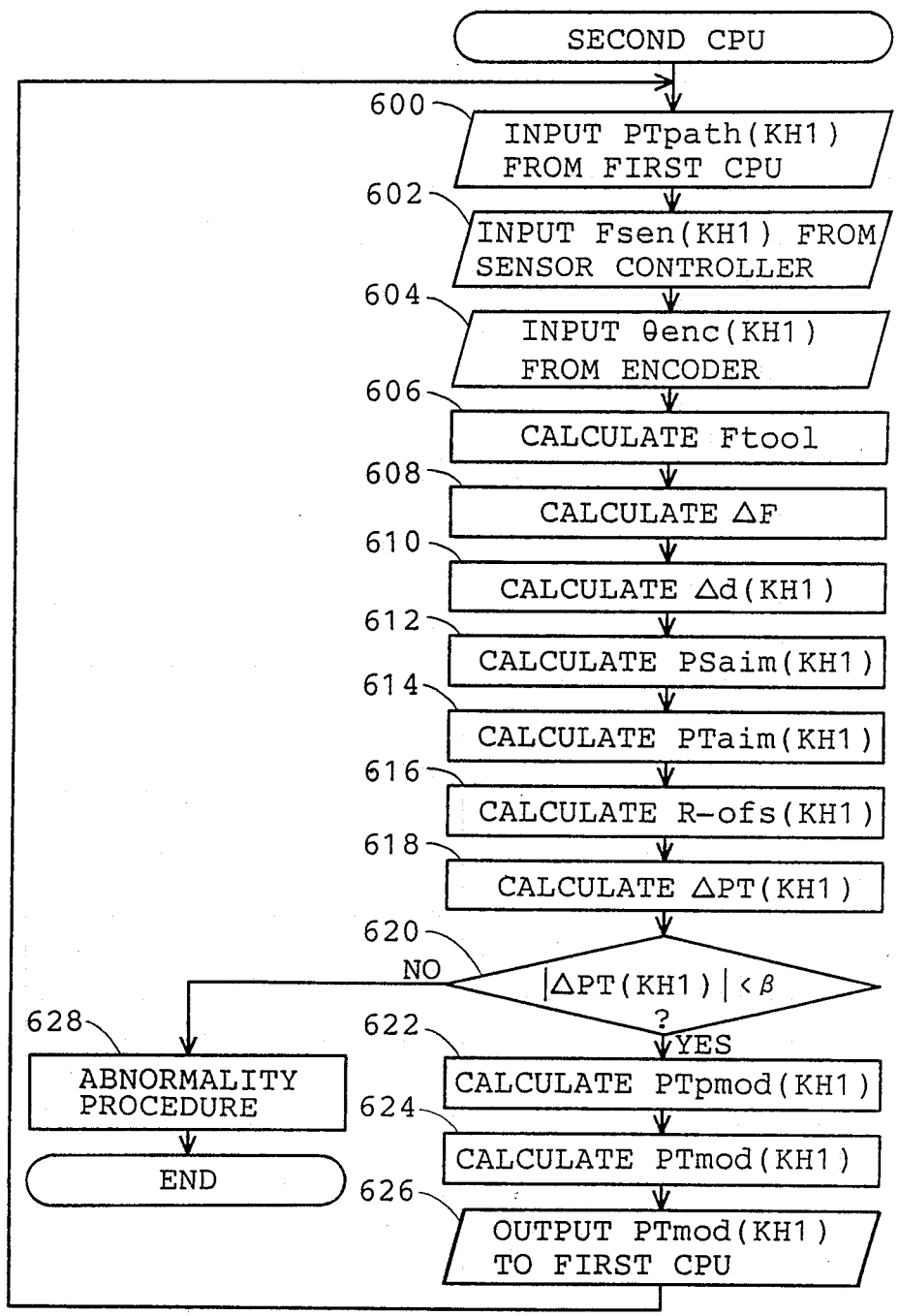
FIG. 11 is a flow chart indicating control processes executed in a second CPU.

The above-mentioned processes executed in the first CPU 300 and the second CPU 301 are shown by flowcharts of FIGS. 10 and 11, respectively. The robot controller 12 of the present embodiment includes two CPUs 300 and 301 shown in FIG. 6. These two CPUs 300 and 301 carry out their respective procedures in parallel with each other.

When the robot 10 starts a particular job in response to the operation start signal, the first CPU 300 proceeds through the following steps in sequence:

Step 500: Calculates the standard-path data PTpath(KH1) by interpolating the teaching-point data PTtch(KH1) stored in the memory 400.

Step 502: Send the standard-path data PTpath(KH1) to the second CPU 301, and request the modified-target-point data PTmod(KH1) from the second CPU 301.

Step 504: Receive PTmod(KH1) from the second CPU 301.

Step 506: Convert PTmod(KH1) into the rotation angle $\theta$host(KH1) for each axis.

Step 508: Send the rotation angle $\theta$host(KH1) to the servo circuits 320 through 330 for the six axes.

Step 510: Increment KH1 by 1, and returning to step 500 to repeat the steps 500 through 510.

The second CPU 301 executes the following steps:

Step 600: Receive the standard-path data PTpath(KH1) from the first CPU 300.

Step 602: Receive the force data Fsen(KH1) from the sensor controller 24.

Step 604: Receive the rotation angle data $\theta$enc(KH1) from the individual axis encoders 34, 44, 54, 64, 74, and 84 at the moment when the force sensor 22 starts its measurement.

Steps 606, 608, 610, 612, 614, 616, and 618: Calculate Ftool, $\Delta$F, $\Delta$d(KH1), PSaim(KH1), PTaim(KH1), R-ofs(KH1), and $\Delta$PT(KH1) according to their corresponding formulas.

Step 620: Compare the correction amount $\Delta PT(KH1)$ with the predetermined value $\beta$. If $||\Delta PT(KH1)|| \geq \beta$, the program proceeds to step 628. If $||\Delta PT(KH1)|| < \beta$, it proceeds to step 622.

Step 622: Calculate the work-point correction data PTpmod(KH1).

Step 624: Calculate the modified-target-point data PTmod(KH1).

Step 626: Send the modified-target-point data PTmod(KH1) to the first CPU 300, and return to step 600.

Step 628: Stop the robot 10 as an emergency measure, and terminate the process.

By repeating the above-mentioned process steps, the robot 10 continues operation while adjusting the force of the grindstone 20 against the workpiece W according to the target force.

Figure 12:
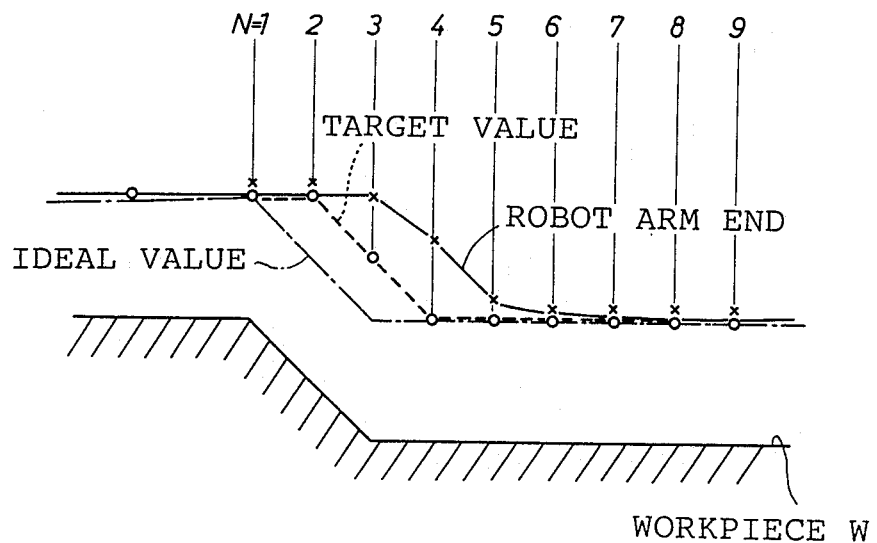
FIG. 12 is an illustration showing the movement of the robot arm end of the present embodiment.
Figure 14A:
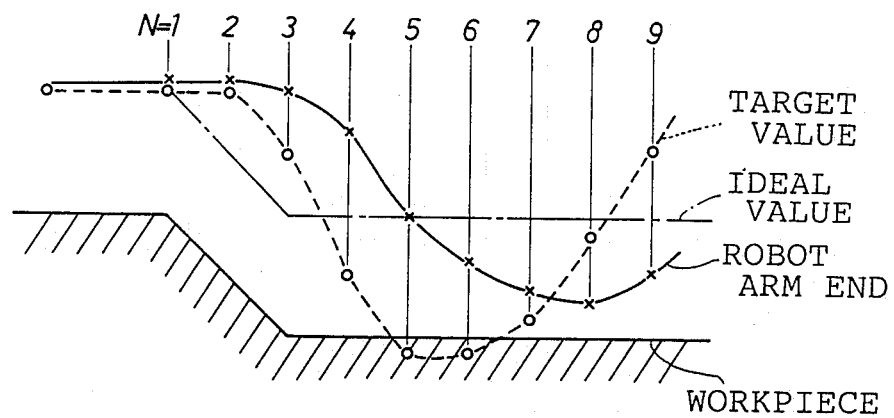
FIGS. 14A and B are illustrations of the movement of the arm end of prior-art robots.
Figure 14B:
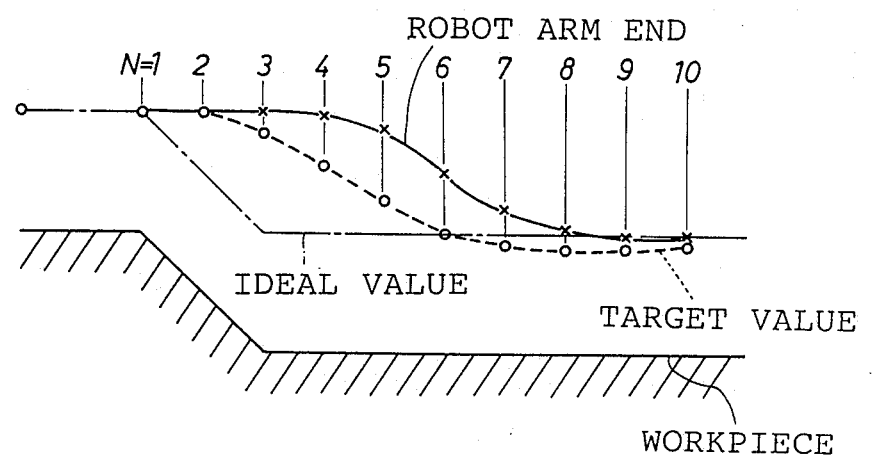

FIG. 12 illustrates the movement of the arm end 18 when a workpiece W identical to the ones used for the conventional robots in FIGS. 14A and 14B is machined by the robot of the present embodiment. In FIG. 12, the solid line indicates the movement of the arm end 18, the broken line indicates the target value of the arm end 18, and the chain line indicates the ideal position of the arm end 18 with the ideal reaction force. While machining the workpiece, the robot arm end travels from left to right in the drawing. FIG. 12 clearly shows that the robot of the present embodiment, in contrast to the prior-art robot, can quickly track the contour of the workpiece W without overshooting.

The present embodiment provides the following effects.

(1) Since the correction amount for determining the target point is calculated based on the information sent from the force sensor 22 and the information concerning the position and attitude of the grindstone 20 on the sensing point, the robot can carry out a particular job quite accurately without reducing its operation speed.

(2) Since the target point is determined based not only on the information from the force sensor 22 but also on the teaching points along a reference path, the robot never deviates from the desired path.

(3) Target points are successively determined in a cycle as short as less than one hundred milliseconds, so that precise control can be realized.

(4) After the target value is calculated, the position and attitude of the tool 20 are controlled based on the servo circuits of the six axes in the same manner as in the prior art. The robot, therefore, can be used as an ordinary teaching play-back robot if force control is not required.

(5) Since the actual control of the position and attitude of the tool 20 is same as that of the prior-art robots, the present embodiment can be realized by supplying only a new CPU board and a new interface for the prior-art teaching play-back robot controller. Consequently, it can inexpensively produce the force-controllable robot.

(6) Besides being a machining robot, this robot can also be used as a balancer: when the operator holds the tip of the force sensor 22 by hand to easily transport a heavy material supported by the robot, the balancer controls the transporting direction.

(7) When the correction amount $\Delta PT$ is calculated, an element of the matrix is appropriately provided for each calculation, so that the force is only adjusted in a required axial direction. For an axis with no need of force control, only the position control is provided.

(8) Since the robot adjusts the dead weight of the tool, it can carry out a particular job in an optional attitude independent of gravity.

While the invention has been shown and described with reference to one preferred embodiment, it should be understood by those skilled in the art that various other changes in form and detail may be made without departing from the spirit and scope of the invention.

Figure 13:
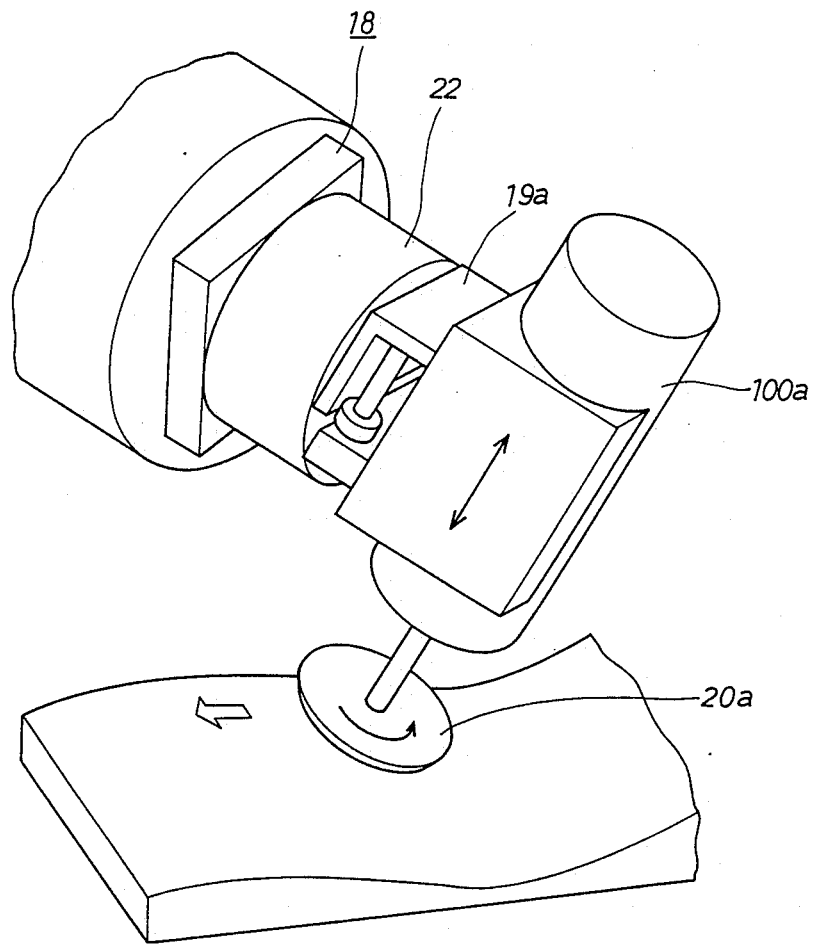
FIG. 13 is a perspective view showing another example of a compliance mechanism.

For example, the present embodiment uses a compliance mechanism 19 (see FIG. 4) that slides perpendicularly to the axis of the grindstone 20. It is also possible to use a compliance mechanism 19a that slides in parallel to the axis of a grindstone 20a as shown by an arrow in FIG. 13. For these compliance mechanisms 19 and 19a, a remote center compliance system, which is generally called a RCC, can be used.

In the present embodiment, the tool position data from the encoders 34, 44, 54, 64, 74, and 84 are converted from the robot coordinate system to the sensor coordinate system in the coordinate conversion circuit 408. The ideal position is then calculated in the form of the sensor coordinate system, and converted to the robot coordinate system again in the coordinate conversion circuit 418. Alternatively, it is also possible to convert the force data from the sensor coordinate system into the robot coordinate system so as to be used in the calculation of the ideal position. In such case, the coordinate conversion circuits 408 and 418 in FIG. 6 are omitted, and another coordinate conversion circuit is provided after the sensor controller 24 in order to convert the force data from the sensor coordinate system to the robot coordinate system. In this case, too, the calculations described in the present embodiment can be used, though each value would be indicated in the robot coordinate system.

What is claimed is:

1. A tracking control robot which moves an arm holding a tool at arm end along a standard path in a coordinate system to act on a workpiece with a preset target force, comprising:

position-data storing means for obtaining and storing reference position and attitude data corresponding to the standard path;

standard-path data generating means for generating standard path position and attitude data from the reference position and attitude data;

present-condition detection means for detecting a present position and attitude of the arm end at a detecting point;

reaction-force detection means for detecting a reaction force transmitted from the workpiece to the tool at the detecting point;

displacement conversion means for calculating the difference between the detected reaction force and the present target force at the detecting point for the present position and attitude of the arm end, and for converting the difference into the displacement position of the tool;

ideal-condition calculation means for calculating an ideal position and attitude of the arm end based on the displacement position of the tool and on the present position and attitude of the arm end;

correction-amount calculation means for calculating a correction amount for the position and attitude of the arm end in accordance with a comparison between the ideal position and attitude of the arm end, and the standard path position and attitude data;

modified-standard-path data calculation means for calculating modified standard path position and attitude data from the standard path position and attitude data and the correction amount; and arm-end control means for controlling the position and attitude of the arm end in real time according to the modified standard path position and attitude data.

2. A tracking control robot according to claim 1 in which, the arm-end control means include motors for driving the arm end, and the present-condition detection means further comprises: a rotation sensor attached to the axes of the motors and means for generating, in response to signals from the rotation sensor, position and attitude data for the end of the sensor and position and attitude data for a work point of the tool, the data being based on a predetermined point in the coordinate system, and for calculating the present position and attitude of the tool from these data.

3. A tracking control robot according to claim 1 in which the present-condition detection means and the reaction-force detection means simultaneously execute their respective detections.

4. A tracking control robot according to claim 1 in which the reaction-force detection means are provided between the displacement conversion means and the tool for detecting a value of the force on the displacement conversion means, the detected value being the difference between the force of gravity on the tool and the reaction force transmitted from the workpiece to the tool.

5. A tracking control robot according to claim 1 in which the displacement conversion means include means for calculating a degree of change in the reaction force according to a degree of change in the value of force detected by the reaction-force detection means.

6. A tracking control robot according to claim 1 in which the displacement conversion means include means for calculating the displacement in the position of the tool such that the reaction force from the workpiece to the tool is equal to the preset target force, by using an equation of motion of the tool as a material particle, the equation including the degree of change in the reaction force, and a viscosity coefficient and a spring constant for the displacement-to-force conversion mechanism.

7. A tracking control robot according to claim 6 in which the ideal-condition calculation means include means for calculating the ideal position and attitude of the arm end according to the displacement in the position of the tool and the present position and attitude of the arm end.

8. A tracking control robot according to claim 1 in which:

the position-data storing means includes a storage means for holding the reference position and attitude data for the arm end on a standard path, the data being stored in advance according to a particular teaching method; and the standard-path data generating means include means for reading out the reference position and attitude data from the storage means, interpolating the standard path position and attitude data from the reference position and attitude data, and sending the standard path position and attitude data to the correct-amount calculation means.

9. A tracking control robot according to claim 1 in which the correction-amount calculation means include means for calculating a deviation between the ideal position and attitude of the arm and the standard path position and attitude data of the arm end, respectively, so as to calculate the correction amount for the position and attitude of the arm end.

10. A tracking control robot according to claim 1 in which the correction-amount calculation means include means for modifying the correction amount for the position and attitude of the arm end by a preset offset value.

11. A tracking control robot according to claim 1 in which the correction-amount calculation means include means for comparing the correction amount for the position and attitude of the arm end with a predetermined value and for controlling in real time the position and attitude of the arm end only when the correction amount is smaller than the predetermined value.

12. The tracking control robot of claim 1 in which the arm-end control means includes:
  a kinematic control circuit for converting the modified standard path position and attitude data into control commands.

13. The tracking control robot of claim 12, in which:
  the position-data storing means, the standard-path data generating means, and the kinematic control circuit constitute a first process means;
  the displacement conversion means, the ideal-condition calculation means, the correction amount calculation means, and the modified-standard-path data generating means constitute a second processing means; and
  the first and second processing means operate in parallel such that the control means controls the position and attitude of the arm end in real time.

14. A tracking control robot which moves an arm holding a tool at arm end along a standard path in a robot coordinate system to act on a workpiece with a preset target force, comprising:

position-data storing means for obtaining and storing reference position and attitude data corresponding to the standard path;
  standard-path data generating means for generating standard path position and attitude data from the reference position and attitude data;
  present-condition detection means for detecting a present position and attitude of the arm end at a detecting point in a sensor coordinate system;
  reaction-force detection means for detecting a reaction force transmitted from the workpiece to the tool at the detecting point;
  displacement conversion means for calculating the difference between the detected reaction force and the preset target force at the detecting point for the present position and attitude of the arm end, and for converting the difference into the displacement position of the tool;
  ideal-condition calculation means for calculating an ideal position and attitude of the arm end in the sensor coordinate system based on the displacement position of the tool and on the present position and attitude of the arm end;
  conversion means for converting the ideal position and attitude of the arm end from the sensor coordinate system into the robot coordinate system;
  correction-amount calculation means for calculating a correction amount for the position and attitude of the arm end in the robot coordinate system in accordance with a comparison between the converted ideal position and attitude of the arm end, and the standard path position and attitude data;
  modified-standard-path data calculation means for calculating modified standard path position and attitude data from the standard path position and attitude data and the correction amount; and
  arm-end control means for controlling the position and attitude of the arm end in real time according to the modified standard path data.

* * * * *

UNITED STATES PATENT AND TRADEMARK OFFICE
CERTIFICATE OF CORRECTION

PATENT NO. : 4,967,127

DATED : October 30, 1990

INVENTOR(S) : ISHIGURO ET AL.

It is certified that error appears in the above-identified patent and that said Letters Patent is hereby corrected as shown below:

Claim 1, column 13, line 57, "present" should be --preset--.

Signed and Sealed this

First Day of September, 1992

Attest:

DOUGLAS B. COMER

Attesting Officer

Acting Commissioner of Patents and Trademarks